July 13, 1954     O. R. SCHOENROCK     2,683,513
SPRING-CONTROLLED PLATE CLUTCH
Filed Oct. 22, 1949
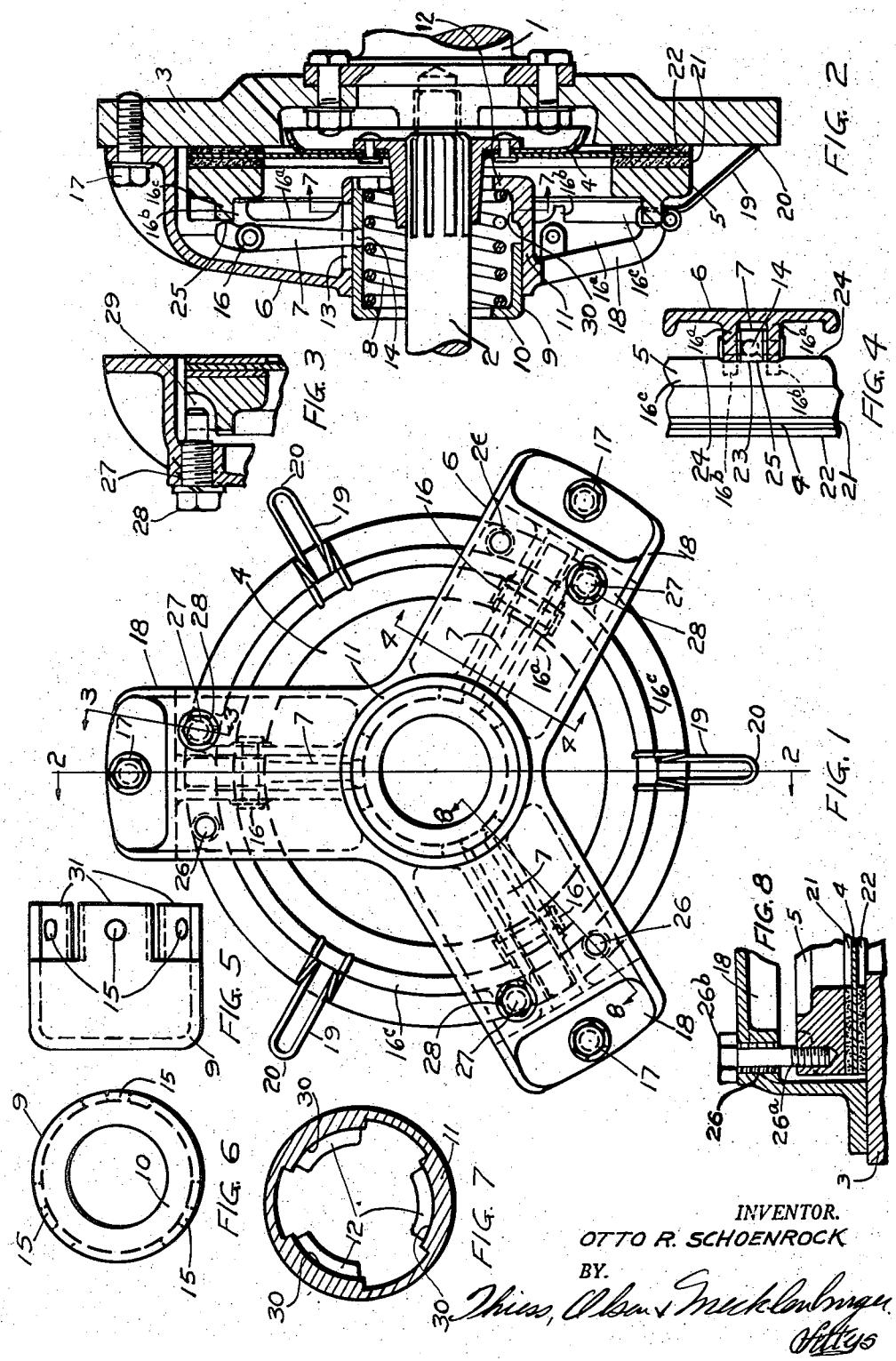
INVENTOR.
OTTO R. SCHOENROCK Patented July 13, 1954

2,683,513

UNITED STATES PATENT OFFICE 2,683,513

SPRING-CONTROLLED PLATE CLUTCH

Otto R. Schoenrock, Oak Park, Ill.

Application October 22, 1949, Serial No. 122,949

6 Claims. (Cl. 192—99)

My invention relates to spring-controlled plate clutches.

One of the objects of my invention is to provide a spring-controlled plate clutch in which the overall axial length of the space required for the pressure plate and controls therefor is small, thus reducing the space required between the clutch plate and the variable speed transmission in the rear of the clutch plate.

A further object of my invention is to provide a mounting for the pressure plate control levers which will enable ready access to the pressure plate for adjustment, which will provide ventilation for the clutch parts, and which will make the clutch self-cleaning.

A further object of my invention is to provide such a construction in which the pressure plate control levers are mounted on the arms of a spider-like mounting.

A further object is to provide improved spring means for relieving the pressure plate from clamping action when the clutch plate is released.

Further objects and advantages of the invention will be apparent from the description and claims.

In the drawings, in which an embodiment of my invention is shown,

Figure 1 is a rear elevational view of the clutch;

Fig. 2 is a section substantially on the line 2—2 of Fig. 1;

Fig. 3 is a section substantially on the line 3—3 of Fig. 1;

Fig. 4 is a section substantially on the line 4—4 of Fig. 1;

Fig. 5 is a side elevational view of the cup-like housing for the clutch-applying spring;

Fig. 6 is a view from the left of the housing of Fig. 5;

Fig. 7 is a sectional view of the hub of the lever support substantially on the line 7—7 of Fig. 1; and Fig. 8 is a section substantially on the line 8—8 of Fig. 1.

Referring to the drawings in detail, the clutch construction shown therein comprises a drive shaft 1, a driven shaft 2, a flywheel 3 secured to the drive shaft 1, a clutch plate 4 secured to rotate with the driven shaft, a pressure plate 5 mounted to rotate with the drive shaft and have axial movement with respect thereto for clamping the clutch plate 4 to rotate with the drive shaft 1, a spider-like support 6 for the pressure plate 5 and the levers 7 which actuate the pressure plate for releasing the pressure plate from pressure-applying position, a coil compression spring 8 surrounding the driven shaft 2 for acting on the levers 7 to cause the pressure plate 5 to grip the clutch plate 4 to cause it to rotate with the drive shaft 1, a sleeve or housing 9 surrounding the spring 8 having an inwardly extending flange or shoulder 10 for engaging the rear end of the spring 8, and a second hub-like sleeve 11 forming part of the lever support 6 and surrounding the first sleeve 9 and having nonrotatable telescopic engagement therewith and having a plurality of arcuate inwardly-extending shoulders 12 for engaging the front end of the spring 8. The second sleeve 11 has a plurality of openings or slots 13 therein through which the ends 14 of the levers 7 extend for engagement in openings 15 provided in the inner sleeve 9 whereby movement of the inner sleeve will cause rocking movement of the levers 7 about the pivot pins 16 on the spider-like lever support 6. This spider-like support is secured to the flywheel by means of screw bolts 17 extending through the arms 18 of the spider. It will be noted that the levers 7 engage the inner sleeve 9 at points intermediate the ends of the spring 8, thus providing a small overall axial length of the space required for the pressure plate 5, controlling spring 8, and pressure plate controlling levers 7 and the housings and mountings of the spring and levers. The radially-extending arms 18 of the spider-like supporting member 6 are channel-like in transverse cross section, as shown in Figs. 1, 2 and 4, thus providing ample strength and affording a recess or housing for the levers 7 pivotally mounted therein.

For relieving the annular pressure plate 5 from clamping action when the clutch plate 4 is released by pressure exerted forwardly on the spring housing 9, the pressure plate has secured adjacent its outer generally circular periphery a plurality of cantilever wire springs 19 which extend radially outwardly beyond the periphery of the pressure plate and have their free ends 20 bearing on the face of the flywheel 3 at points intermediate the points where the arms 18 of the spider are secured to the flywheel.

Assuming that the clutch is "in" and it is desired to release it, axial pressure is exerted on the sleeve 9 in any suitable manner as by pedal or automatic means to force the sleeve 9 forwardly. This compresses the spring 8 between the shoulders 10 and 12 and pushes the inner ends of the rock levers 7 forwardly, thus moving the outer ends 25 rearwardly. This relieves the forward pressure on the pressure plate 5 and releases the clutch. The cantilever springs 19 force the pressure plate 5 rearwardly, thus freeing it from the clutch plate 4. To let the clutch in, the forward pressure is removed from the sleeve 9, enabling the spring 8 to force the sleeve 9 rearwardly. This rearward movement of the sleeve 9 rocks the levers 7 to cause the outer ends 28 to exert pressure on the pressure plate 5 and clamp the clutch plate 4 in driven relation with respect to the flywheel 3.

In order to compensate for wear on the friction plates 21 and 22, the pressure plate 5 is provided with means for mounting it for axial movement in any one of a plurality of different angular adjustments with respect to the levers 7 and has a plurality of sets of lever-engageable shoulders 23 and 24, these sets being axially offset with respect to each other as shown in Fig. 4. For effecting the angular adjustment of the pressure plate 5 with respect to the engaging ends 25 of the actuating levers and for providing means for mounting the pressure plate for axial movement with respect to the plate-supporting spider 6, each arm of the spider is provided with two angularly-spaced tapped holes 26 and 27 in either one of which may be threaded a screw bolt 28, the inner end of which is engageable with a guiding and positioning notch 29 (Fig. 3) in the periphery of the pressure plate 5. For angularly adjusting the pressure plate from a position in which the depressed shoulders 23 of the pressure plate engage the actuating ends 25 of the levers 7 to a position in which the raised shoulders 24 of the plate are engageable with the ends of the levers, or vice versa, the screw bolts 28 are screwed out of the holes 27 to disengage them from the notches 29 in the pressure plate 5, the pressure plate is shifted angularly to bring the notches 29 in the plate opposite the set of holes 26 in the arms of the spider and the screw bolts are screwed into the holes 26 to cause their ends to enter the notches 29 in the pressure plate.

As shown in Figs. 1, 2, and 4, the pivot pins 16 extend through the levers 7 and through the walls 16ᵃ of the channel-like arms 18 of the spider 6. The pressure plate 5 is held in axial alignment with the spider 6 by circumferentially spaced lugs 16ᵇ extending from the walls 16ᵃ for engagement with the annular flange 16ᶜ on the pressure plate 5.

In order to hold the holes 15 in the inner sleeve into which the ends 14 of the levers 7 extend in alignment with the slots 13 in the hub 11 through which the arms of the lever extend, the inner sleeve 9 and hub-like sleeve 11 are provided with a longitudinal tongue-and-groove connection which enables relative axial movement between the sleeves but which prevents angular relative rotation between the sleeves. This construction is shown in Figs. 2, 5, 6, and 7. As there shown, the forward end of the outer sleeve is provided with longitudinally-extending ribs 30 which are straddled and slidably engaged by the tongues 31 extending forwardly from the front edge of the cup-like inner housing 9. This avoids the use of keys and keyways and lessens the overall fore-and-aft length of the sleeves. The relatively small diameter of the compression spring 8 and inner and outer sleeves 9 and 11 results in inexpensive construction.

It will be seen that in the above construction, the overall fore-and-aft length of the pressure plate 5, compression spring 8, inner and outer sleeves 9 and 11, levers 7, and supporting means, is extremely short, and that the spider-like support 6 provides for ventilation and a continuous flow of air passing over the clutch parts when running, and prevents the clutch from becoming clogged. It will also be seen that the spider-like support 6 enables the pressure plate to be reached easily for angular adjustment for taking up wear on the clutch plate. It is obvious that a multiple disc clutch could be made along the general lines shown. Any type of control for effecting forward movement of the spring-controlling housing 9 may be provided, such as a foot control or an automatic clutch actuator for the control sleeve 9.

In order to facilitate field service of the clutch and also to facilitate the assembly of the clutch for shipment, means are provided for securing the pressure plate 5 and the spider 6 together as a unit. For this purpose, I provide the pressure plate 5 with tapped holes 26ᵃ which will be in alignment with the holes 26 in the spider arms when the positioning notches 29 are in alignment with the screw bolts 28. With this construction cap screws or screw bolts 26ᵇ, which will turn freely in the tapped openings 26 without engaging their threads, can be inserted through these holes 26 and threaded into the tapped openings 26ᵃ to draw the pressure plate 5 and spider 6 toward each other to further compress the spring 8 and hold it in compressed position.

With this construction, if the clutch is used in front of a tractor transmission and needs to be serviced in the field, the transmission, including the shaft 2, is removed and the cap screws are inserted through the holes 26 in the spider and screwed down into the tapped holes 26ᵃ in the pressure plate to clamp the pressure plate and spider toward each other. When thus clamped together, the cap screws 17 may be removed and the clamping plate 5 with spider 6, levers 7, and spring 8 removed as a unit.

It is obvious that this unit construction facilitates servicing the clutch in the field and also preparing the clutch assembly for shipment.

Further modifications will be apparent to those skilled in the art, and it is desired, therefore, that the invention be limited only by the scope of the appended claims.

Having thus described my invention, what I claim and desire to secure by Letters Patent is:

1. A clutch construction comprising a drive shaft, a flywheel concentric with and driven by said drive shaft, a driven shaft, a clutch plate secured to rotate with said driven shaft, a pressure plate mounted to rotate with said drive shaft and having axial movement with respect thereto, for clamping said clutch plate to rotate with the drive shaft, an actuating lever support secured to rotate with said flywheel and drive shaft, levers pivotally mounted thereon for releasing said pressure plate from pressure-applying position, a coil compression spring surrounding said driven shaft for acting on said levers to cause the pressure plate to grip the clutch plate to cause it to rotate with the drive shaft, a sleeve surrounding said spring having an inwardly-extending shoulder for engaging the rear end of the spring, and a second sleeve surrounding said first sleeve and having nonrotatable telescopic engagement therewith, and having an inwardly-extending shoulder for engaging the other end of the spring, and firmly united and rotatable with said lever support, the forward annular edge of said second sleeve lying forwardly of the rearward annular edge of said pressure plate, said first sleeve being in force-transmitting engagement with respect to said actuating lever.

2. A clutch construction comprising a drive shaft, a flywheel concentric with and driven by said drive shaft, a driven shaft, a clutch plate secured to rotate with said driven shaft, a pressure plate mounted to rotate with said drive shaft and having axial movement with respect thereto, for clamping said clutch plate to rotate with the drive shaft, an actuating lever support secured to rotate with said flywheel and drive shaft, levers pivotally mounted thereon for releasing said pressure plate from pressure-applying position, a coil compression spring surrounding said driven shaft for acting on said levers to cause the pressure plate the grip the clutch plate to cause it to rotate with the drive shaft, a sleeve surrounding said spring having an inwardly-extending shoulder for engaging the rear end of the spring, and a second sleeve surrounding said first sleeve and having nonrotatable telescopic engagement therewith, and having an inwardly-extending shoulder for engaging the other end of the spring, and firmly united and rotatable with said lever support, said second sleeve having an opening therein through which said levers extend for engagement with said first sleeve, the forward annular edge of said second sleeve lying forwardly of the rearward annular edge of said pressure plate, said first sleeve being in force-transmitting engagement with respect to said actuating lever.

3. A clutch construction comprising a drive shaft, a flywheel concentric with and driven by said drive shaft, a driven shaft, a clutch plate secured to rotate with said driven shaft, a pressure plate mounted to rotate with said drive shaft and having axial movement with respect thereto, for clamping said clutch plate to rotate with the drive shaft, an actuating lever support secured to rotate with said flywheel and drive shaft, levers pivotally mounted thereon for releasing said pressure plate from pressure-applying position, a coil compression spring surrounding said driven shaft for acting on said levers to cause the pressure plate to grip the clutch plate to cause it to rotate with the drive shaft, a sleeve surrounding said spring having an inwardly-extending shoulder for engaging the rear end of the spring, and a second sleeve surrounding said first sleeve and having nonrotatable telescopic engagement therewith, and having an inwardly-extending shoulder for engaging the other end of the spring, and firmly united and rotatable with said lever support, each lever being pivoted intermediate its ends on said support and having one end in engagement with said pressure plate and its other end in engagement with said first sleeve, the forward annular edge of said second sleeve lying forwardly of the rearward annular edge of said pressure plate, said first sleeve being in force-transmitting engagement with respect to said actuating lever.

4. A clutch construction comprising a drive shaft, a flywheel concentric with and driven by said drive shaft, a driven shaft, a clutch plate secured to rotate with said driven shaft, a pressure plate mounted to rotate with said drive shaft and having axial movement with respect thereto, for clamping said clutch plate to rotate with the drive shaft, an actuating lever support secured to rotate with said flywheel and drive shaft, levers pivotally mounted thereon for releasing said pressure plate from pressure-applying position, a coil compression spring surrounding said driven shaft for acting on said levers to cause the pressure plate to grip the clutch plate to cause it to rotate with the drive shaft, a sleeve surrounding said spring having an inwardly-extending shoulder for engaging the rear end of the spring, and a second sleeve surrounding said first sleeve and having nonrotatable telescopic engagement therewith, and having an inwardly-extending shoulder for engaging the other end of the spring, and firmly united and rotatable with said lever support, said levers engaging the inner sleeve at points intermediate the ends of the spring, the forward annular edge of said second sleeve lying forwardly of the rearward annular edge of said pressure plate, said first sleeve being in force-transmitting engagement with respect to said actuating lever.

5. A clutch construction comprising a drive shaft, a flywheel concentric with and driven by said drive shaft, a driven shaft, a clutch plate secured to rotate with said driven shaft, a pressure plate mounted to rotate with said drive shaft and having axial movement with respect thereto, for clamping said clutch plate to rotate with the drive shaft, an actuating lever support secured to rotate with said flywheel and drive shaft, levers pivotally mounted thereon for releasing said pressure plate from pressure-applying position, a coil compression spring surrounding said driven shaft for acting on said levers to cause the pressure plate to grip the clutch plate to cause it to rotate with the drive shaft, a sleeve surrounding said spring having an inwardly-extending shoulder for engaging the rear end of the spring, and a second sleeve surrounding said first sleeve and having nonrotatable telescopic engagement therewith, and having an inwardly-extending shoulder for engaging the other end of the spring, and firmly united and rotatable with said lever support, said sleeves having a longitudinally-extending tongue-and-groove connection with each other, the forward annular edge of said second sleeve lying forwardly of the rearward annular edge of said pressure plate, said first sleeve being in force-transmitting engagement with respect to said actuating lever.

6. A clutch construction comprising a drive shaft, a flywheel concentric with and driven by said drive shaft, a driven shaft, a clutch plate secured to rotate with said driven shaft, a pressure plate mounted to rotate with said drive shaft and having axial movement with respect thereto, for clamping said clutch plate to rotate with the drive shaft, an actuating lever support secured to rotate with said flywheel and drive shaft, levers pivotally mounted thereon for releasing said pressure plate from pressure-applying position, a coil compression spring surrounding said driven shaft for acting on said levers to cause the pressure plate to grip the clutch plate to cause it to rotate with the drive shaft, a sleeve surrounding said spring having an inwardly-extending shoulder for engaging the rear end of the spring, and a second sleeve surrounding said first sleeve and having nonrotatable telescopic engagement therewith, and having an inwardly-extending shoulder for engaging the other end of the spring, and firmly united and rotatable with said lever support, said second sleeve having an opening therein through which said levers extend for engagement with said first sleeve, said sleeves having a longitudinally-extending tongue-and-groove connection with each other, the forward annular edge of said second sleeve lying forwardly of the rearward annular edge of said pressure plate, said first sleeve being in force-transmitting engagement with respect to said actuating lever.

References Cited in the file of this patent

UNITED STATES PATENTS

| Number | Name | Date |
|---|---|---|
| 1,279,243 | Bruce et al. | Sept. 17, 1918 |
| 1,300,831 | Ferguson | Apr. 15, 1919 |
| 1,427,654 | Thiell | Aug. 29, 1922 |
| 1,455,587 | Hamilton | May 15, 1923 |
| 1,511,651 | Brake | Oct. 14, 1924 |
| 1,748,148 | Ruesenberg | Feb. 25, 1930 |
| 1,915,732 | Goldschmidt | June 27, 1933 |
| 1,928,084 | Worner | Sept. 26, 1933 |
| 1,942,691 | Fink | Jan. 9, 1934 |
| 2,105,932 | Ruesenberg | Jan. 18, 1938 |
| 2,117,482 | Klix | May 17, 1938 |
| 2,204,879 | Batten et al. | June 18, 1940 |
| 2,214,780 | Thelander | Sept. 17, 1940 |
| 2,287,631 | Miller | June 23, 1942 |
| 2,326,279 | Banker | Aug. 10, 1943 |
| 2,453,344 | Root | Nov. 8, 1948 |
| 2,519,414 | Thelander | Aug. 22, 1950 |

FOREIGN PATENTS

| Number | Country | Date |
|---|---|---|
| 405,342 | Great Britain | Feb. 5, 1934 |
| 662,766 | France | Aug. 12, 1929 |
| 765,330 | France | June 8, 1934 |
| 889,218 | France | Jan. 4, 1944 |